(12) United States Patent
Zhang et al.

(10) Patent No.: US 9,043,945 B2
(45) Date of Patent: May 26, 2015

(54) ENCRYPTION KEYPAD CAPABLE OF PREVENTING ILLEGAL DISASSEMBLY

(75) Inventors: Junkun Zhang, Guangzhou (CN); Zhulong Lin, Guangzhou (CN); Jing He, Guangzhou (CN); Ying Han, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 308 days.

(21) Appl. No.: 13/810,415

(22) PCT Filed: Jul. 22, 2011

(86) PCT No.: PCT/CN2011/077479
§ 371 (c)(1),
(2), (4) Date: Jan. 15, 2013

(87) PCT Pub. No.: WO2012/024995
PCT Pub. Date: Mar. 1, 2012

(65) Prior Publication Data
US 2013/0160149 A1    Jun. 20, 2013

(30) Foreign Application Priority Data

Aug. 27, 2010    (CN) .......................... 2010 1 0269434

(51) Int. Cl.
*G06F 21/83*    (2013.01)
*G06F 21/86*    (2013.01)
*G09C 1/00*    (2006.01)

(52) U.S. Cl.
CPC ................ *G06F 21/83* (2013.01); *G06F 21/86* (2013.01); *G09C 1/00* (2013.01); *G06F 2221/2101* (2013.01); *G06F 2221/2107* (2013.01)

(58) Field of Classification Search
CPC ........ G06F 21/86; G06F 21/83; G07F 7/1016
USPC ............................................ 726/34; 340/541
See application file for complete search history.

(56) References Cited

U.S. PATENT DOCUMENTS

2011/0279279 A1* 11/2011 Mirkazemi-Moud et al. .............................. 340/635
2012/0025983 A1*  2/2012 Ben-Zion et al. ............. 340/541

FOREIGN PATENT DOCUMENTS

BR    9203958 A    4/1994
CN    1987833 A    6/2007

(Continued)

OTHER PUBLICATIONS

International Search Report dated Oct. 12, 2011 from corresponding International Application No. PCT/CN2011/077479.

*Primary Examiner* — Jason K Gee
(74) *Attorney, Agent, or Firm* — Wolf, Greenfield & Sacks, P.C.

(57) ABSTRACT

An enhanced encryption keypad (100) capable of preventing illegal disassembly for an automated teller machine comprises a key panel (101) and a main control board (102). A removal detection protection circuit is disposed inside a main chip of the main control board (102), and at least one pin of the removal detection protection circuit is guided out from a surface (1021) of a side of the main control board (102) near the key panel to form a removal detection point (1022). The removal detection point (1022) has two opened signal contact points. The two opened signal contact points are conducted by a conductive adhesive (103) to activate the removal detection protection circuit. A conductive protection ring (1023) isolated from the removal detection point is disposed at the periphery of the removal detection point. The conductive protection ring (1023) is connected to the removal detection protection circuit inside the main control chip. A protection circle (1024) is disposed at the periphery of the conductive protection ring and the corresponding conductive adhesive. The present application effectively protects the encryption keypad from illegal attacks on the removal detection point from the side.

10 Claims, 5 Drawing Sheets

(56) References Cited

FOREIGN PATENT DOCUMENTS

| CN | 101667064 A | 3/2010 |
|---|---|---|
| CN | 101697182 A | 4/2010 |
| CN | 201449636 U | 5/2010 |
| CN | 201489599 U | 5/2010 |
| CN | 101944244 A | 1/2011 |
| DE | 3043593 A1 | 6/1982 |
| FR | 2871924 B1 | 9/2008 |

* cited by examiner

ENCRYPTION KEYPAD CAPABLE OF PREVENTING ILLEGAL DISASSEMBLY

The present application is the U.S. National Phase of International Application No. PCT/CN2011/077479 filed on Jul. 22, 2011, and claims the benefit of priority to Chinese patent application No. 201010269434.3 titled "ENCRYPTION KEYBOARD FOR PREVENTING ILLEGAL DISASSEMBLY", filed with the Chinese State Intellectual Property Office on Aug. 27, 2010. The entire disclosures thereof are incorporated herein by reference.

TECHNICAL FIELD OF THE INVENTION

The present invention relates to an encryption keyboard, and in particular to an encryption keyboard for preventing illegal disassembly used for automatic teller machines.

BACKGROUND OF THE INVENTION

The hard encryption keyboard of a bank self-service equipment bears works of inputting and encrypting a bank password of a user, and thus a working key and a master key of the bank are stored in a core processing part of the keyboard. For an unspeakable purpose, some criminals usually jimmy or poke the keyboard to steal the user password and even to decrypt the working key and master key of the bank in order to steal bank information, which threatens the security of information and money of the user and the bank directly.

The existing ATM encryption keyboard includes a keyboard panel and a main control board. A removal detection and protection circuit is provided in a main chip in the main control board, and a plurality of lead pins of the removal detection and protection circuit are led out from the main control board to form removal detection points. Each removal detection point is provided with two disconnected signal contacts which are connected to the removal detection and protection circuit of the main chip via inner wirings of the main control board. Conductive adhesive is provided on a surface, which contacts with the main control board, of the keyboard panel at positions corresponding to the removal detection points of the main control board. When the keyboard is mounted on the mounting panel of the ATM, the keyboard panel presses the conductive adhesive, so that the conductive adhesive contacts with and connects with the disconnected removal detection points on the main control board to form a closed circuit. When the keyboard is being disassembled illegally, the conductive adhesive runs away from the signal contacts to break the circuit, which can be sensed. As a result, the removal detection and protection circuit is triggered to delete sensitive information from the keyboard main chip and to disable relevant functions, thereby preventing the criminal from stealing bank information.

In the prior art, one layer of water-proof silicone rubber is generally provided between the keyboard panel and the main control board in order to enable the encryption keyboard to have a certain water-proof function, and the conductive adhesive is provided between the water-proof silicone rubber and the main control board. This technology has some disadvantages. Since the water-proof silicone rubber is made of elastic material, before disassembling the keyboard the criminal can insert a hard object through the clearance between the conductive adhesive and the panel and thus keep the object to press the conductive adhesive, so as to maintain the continuous connection between the conductive adhesive and the removal detection and protection circuit, and thus the keyboard may be disassembled without being sensed; or the criminal can insert a metal sheet through the clearance between the conductive adhesive and the removal detection points to maintain the continuous connection of the removal detection and protection circuit; or the criminal can fill with conductive glue through the clearance between the conductive adhesive and the removal detection points to maintain the continuous connection of the removal detection and protection circuit. In this way, in the case of being illegally disassembled, the encryption keyboard cannot be self-destructed and the user's password is illegally stolen, even the working key and main key of the bank are decrypted so as to steal the bank information, which threatens the security of information and money of users and bank directly.

SUMMARY OF THE INVENTION

The object of the present invention is to provide an encryption keyboard for preventing illegal disassembly, which may improve the security of the encryption keyboard by providing a guard member at a removal detection point.

In order to achieve the object of the present invention, the present invention provides the following technical solutions.

The encryption keyboard according to the present invention includes a keystroke panel and a main control board. A removal detection and protection circuit is provided in a main chip of the main control board, and at least one lead pin of the removal detection and protection circuit is led out from a surface of the main control board adjacent to the keystroke panel so as to form a removal detection point. The removal detection point is provided with two disconnected signal contacts which are connected by conductive adhesive to activate the removal detection and protection circuit. A conductive protection ring is provided outside the removal detection point and is isolated from the removal detection point. The conductive protection ring is connected to the removal detection and protection circuit in the main chip. A guard member is provided at the outside of the conductive protection ring and of the conductive adhesive.

Optionally, the guard member is provided with at least two hooks, and each of the hooks inserts into a semi-blind hole in a surface of the main control board adjacent to the keystroke panel. The guard member is fixed with the main control board by welding.

Further, the guard member is a conductive metal ring which is electrically connected to the removal detection and protection circuit in the main control board.

Optionally, the guard member is fixedly disposed on a surface, which is adjacent to the main control board, of the keystroke panel at the outside of a position corresponding to the conductive protection ring.

Optionally, the guard member is formed by vertically folding edges of the keystroke panel towards the main control board so as to fully enclose edges of the main control board when being assembled.

Optionally, a bottom board is provided at a side of the main control board away from the keystroke panel. The guard member is fixedly disposed on a surface, which is adjacent to the main control board, of the bottom board at the outside of a position corresponding to the conductive protection ring. The main control board is provided with a groove at a position corresponding to the guard member.

Optionally, a bottom board is provided at a side of the main control board away from the keystroke panel. The guard member is formed by vertically folding edges of the bottom board towards the main control board so as to fully enclose edges of the main control board when being assembled.

Preferably, a water-proof silicone rubber layer is provided between the keystroke panel and the main control board. The water-proof silicone rubber layer is provided with a conductive adhesive recess at a position corresponding to the conductive adhesive.

Further, a groove or a hole for receiving the guard member is provided in the water-proof silicone rubber layer at a position corresponding to the guard member.

Compared with the prior art, the technical solutions of the present invention has following advantages.

First, the guard member is fixedly installed at the outside of the conductive protection ring, which effectively prevents the attack that the criminal inserts a hard object through the clearance between the conductive adhesive and the panel.

Second, such a design may effectively prevent the attack that the criminal inserts a metal sheet through a clearance between the conductive adhesive and the removal detection point to keep the continuous connection of the removal detection and protection circuit.

Third, the conductive protection ring and the metal guard member are electrically connected to the removal detection and protection circuit in the main control board respectively, which may effectively prevent the attack that the criminal fills with conductive silicone glue through the clearance between the conductive adhesive and the removal detection point.

Fourth, the guard member is made of metal material, which may effectively prevent the attack that the criminal heat to melt the guard member.

DETAILED DESCRIPTION OF THE INVENTION

Hereinafter, the technical solutions in embodiments of the present invention will be described clearly and completely in conjunction with drawings in the embodiments of the present invention. Apparently, the described embodiments are only preferred embodiments, not all of the embodiments of the present invention. Based on the embodiments of the present invention, all of other embodiments made by the person skilled in the art without inventive effort are deemed to fall into the protection scope of the present invention.

Figure 1:
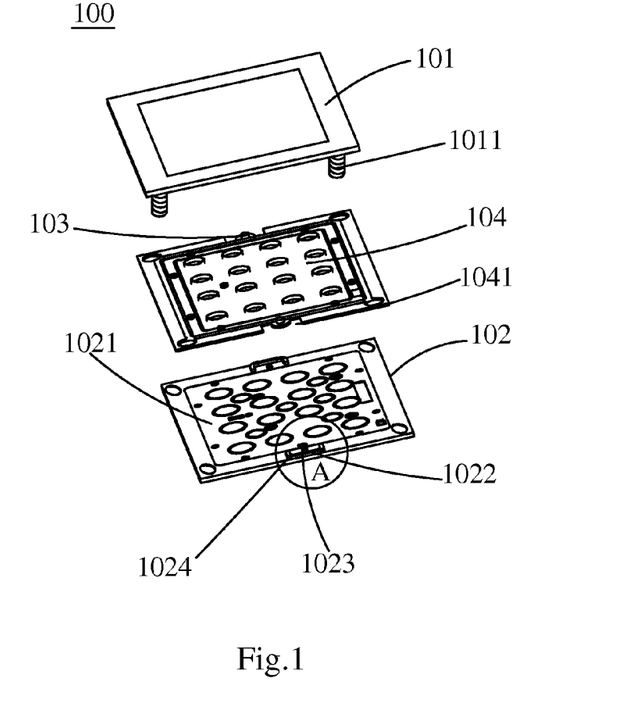
FIG. 1 is an exploded schematic view of an encryption keyboard for preventing illegal disassembly according to a first embodiment of the present invention.
Figure 2:
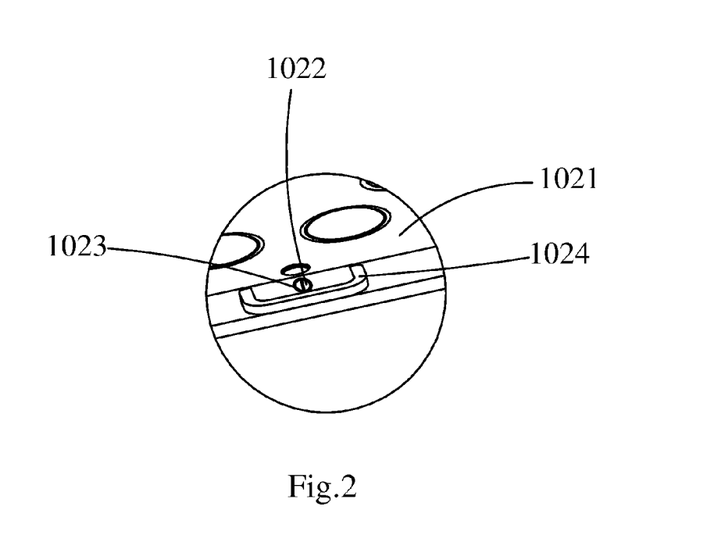
FIG. 2 is a partially enlarged view of part A in FIG. 1.

Referring to FIGS. 1 and 2, FIG. 1 is an exploded schematic view of an encryption keyboard for preventing illegal disassembly according to a first embodiment of the present invention, and FIG. 2 is a partially enlarged view of part A in FIG. 1. An encryption keyboard 100 according to the present invention includes a keystroke panel 101 and a main control board 102. A removal detection and protection circuit (not shown) is provided in a main chip of the main control board 102. At least one lead pin of the removal detection and protection circuit is led out from two opposite edges of the surface 1021, which is adjacent to the keystroke panel 101, of the main control board 102 to form a removal detection point 1022. The removal detection point 1022 is provided with two disconnected signal contacts which are connected by conductive adhesive 103 to activate the removal detection and protection circuit. A conductive protection ring 1023 is provided outside the removal detection point 1022 and is isolated from the removal detection point 1022. The conductive protection ring 1023 is connected to the removal detection and protection circuit in the main chip. A guard member is provided at the outside of the conductive protection ring and of the conductive adhesive.

In the encryption keyboard according to the present embodiment, a water-proof silicone rubber layer 104 is provided between the keystroke panel 101 and the main control board 102 in order to enable the encryption keyboard to have a certain water-proof function. A recess for receiving the conductive adhesive 103 is provided in the water-proof silicone rubber layer 104 at the position corresponding to the conductive adhesive 103.

A hard metal guard member 1024 with a semi-enclosure structure is fixedly installed at the outside of the conductive protection ring 1023 on the main control board 102 by welding. The semi-enclosure guard member 1024 is open towards the center of the main control board, and has four hooks (taking four hooks as an example in this embodiment, at least two hooks are provided, but it is not limited to this). The hooks are inserted into semi-blind holes in the surface 1021, which is adjacent to the keystroke panel, of the main control board 102, and are electrically connected to the removal detection and protection circuit in the main control board. A groove 1041 is provided outside the recess of the water-proof silicone rubber layer 104 for receiving the conductive adhesive 103, and has a shape matched with the guard member 1024.

The thickness of the hard metal guard member 1024 is substantially equal to the thickness of the water-proof silicone rubber layer 104. When the keyboard is fixedly assembled together via stud bolts 1011 on the keystroke panel 101, the water-proof silicone rubber layer 104 and the hard metal guard member 1024 are pressed between the keystroke panel 101 and the main control board 102, and are fixed together tightly. Thus, there is no clearance between the hard metal guard member 1024 and the main control board 102, as well as between the hard metal guard member 1024 and the keystroke panel 101, which can ensure that the removal detection point 1022 is not being attacked by poking from the outside, and can effectively prevent the side surfaces of the encryption keyboard from being attacked by the criminal inserting a hard object through a clearance between the conductive adhesive and the panel.

In addition, such a design may effectively prevent the attack that the criminal inserts a metal sheet through a clearance between the conductive adhesive 103 and the removal detection point 1022 to keep continuous connection of the removal detection and protection circuit. Since both the conductive protection ring 1023 and the metal guard member 1024 are electrically connected to the removal detection and protection circuit in the main control board respectively, when either of the conductive protection wing 1023 and the metal guard member 1024 is connected to the removal detection point, the circuit may be changed, which may be sensed by the main control chip. Thus, the ability of the encryption keyboard for preventing the criminal from filling with conductive silicone glue through the clearance between the conductive adhesive and the removal detection point is increased.

Figure 3:
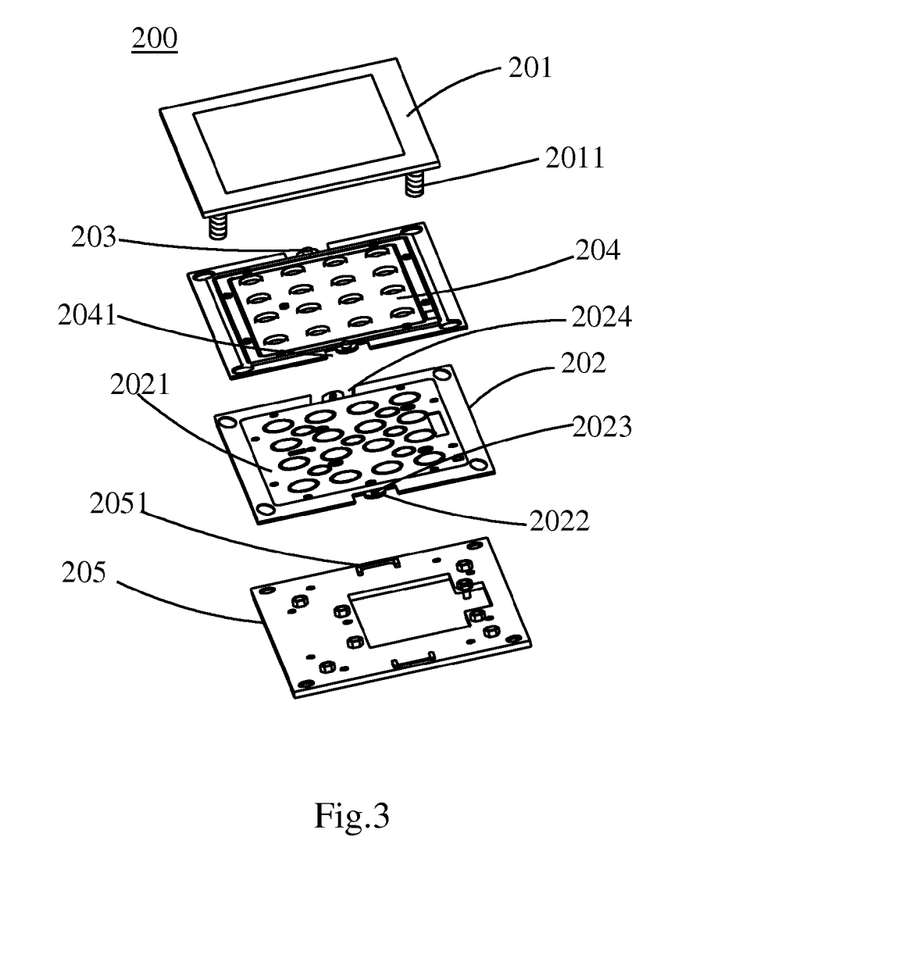
FIG. 3 is an exploded schematic view of an encryption keyboard for preventing illegal disassembly according to a second embodiment of the present invention.

Referring to FIG. 3, an exploded schematic view of an encryption keyboard for preventing illegal disassembly according to a second embodiment of the present invention is shown. An encryption keyboard 200 includes a keystroke panel 201, a main control board 202 and a bottom board 205. A removal detection and protection circuit (not shown) is provided in a main chip of the main control board 202, and two lead pins of the removal detection and protection circuit are led out from two opposite edges of the surface 2021, which is adjacent to the keystroke panel 201, of the main control board 202 to form removal detection points 2022. The removal detection point 2022 is provided with two disconnected signal contacts which are connected by conductive adhesive 203 to activate the removal detection and protection circuit. A conductive protection ring 2023 is provided outside each removal detection point 2022 and is isolated from the removal detection point 2022. The conductive protection rings 2023 are connected to the removal detection and protection circuit in the main chip. In the encryption keyboard according to this embodiment, a water-proof silicone rubber layer 204 is provided between the keystroke panel 201 and the main control board 202 in order to enable the encryption keyboard to have a certain water-proof function. Recesses for receiving the conductive adhesive 203 are provided in the water-proof silicone rubber layer 204 at the positions corresponding to the conductive adhesive 203.

The bottom board 205 is attached to the rear surface of the main control board 202, and is provided with guard members 2051 at the outside of the positions corresponding to the conductive protection rings 2023 of the main control board 202. The guard member 2051 may be welded on the bottom board 205, or may be cast with the bottom board 205 integrally. The guard member 2051 is open towards the center of the main control board 202. Grooves 2024 are respectively provided outside the conductive protection rings 2023 of the main control board 202, and grooves 2041 are provided outside the recesses of the water-proof silicone rubber 204 for receiving the conductive adhesive 203. The grooves 2024 and grooves 2041 have a shape matched with the guard member 2051 so as to partially enclose the conductive adhesive 203 and conductive protection ring 2023. The thickness of the guard member 2051 is equal to the sum of the thickness of the water-proof silicone rubber 204 and the thickness of the main control board 202. When the keyboard is fixedly assembled together via stud bolts 2011 on the keystroke panel 201, the water-proof silicone rubber layer 204 and the main control board 202 are pressed between the key panel 201 and the bottom board 205 and are fixed together tightly. The guard member 2051 partially encloses the removal detection point 2022 around three side surfaces, and closely contacts with the keystroke panel 201, which ensures that the removal detection points 2022 are not being attacked by poking from the outside, and effectively prevents the side surfaces of the encryption keyboard from being attacked by the criminal inserting a hard object through a clearance between the conductive adhesive and the panel.

Figure 4:
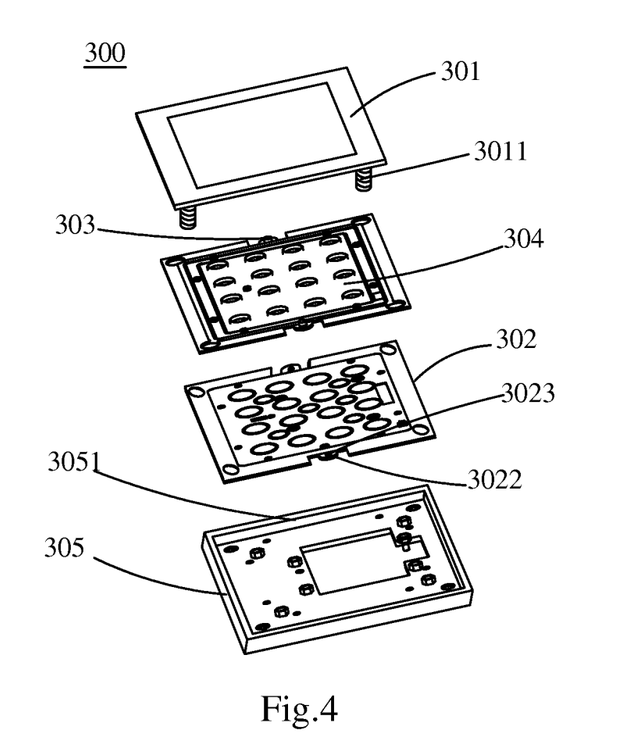
FIG. 4 is an exploded schematic view of an encryption keyboard for preventing illegal disassembly according to a third embodiment of the present invention.

Referring to FIG. 4, an exploded schematic view of an encryption keyboard for preventing illegal disassembly according to a third embodiment of the present invention is shown. An encryption keyboard 300 includes a keystroke panel 301, a main control board 302 and a bottom board 305. A removal detection and protection circuit (not shown) is provided in a main chip of the main control board 302, and two lead pins of the removal detection and protection circuit are led out from two opposite edges of the surface 3021, which is adjacent to the keystroke panel 301, of the main control board 302 to form removal detection points 3022. The removal detection point 3022 is provided with two disconnected signal contacts which are connected by conductive adhesive 303 to activate the removal detection and protection circuit. A conductive protection ring 3023 is provided outside each removal detection point 3022, and is isolated from the removal detection point 3022. The conductive protection ring 3023 is connected to the removal detection and protection circuit in the main chip. In the encryption keyboard according to this embodiment, a water-proof silicone rubber layer 304 is provided between the keystroke panel 301 and the main control board 302 in order to enable the encryption keyboard to have a certain water-proof function, and recesses for receiving the conductive adhesive 303 are provided in the water-proof silicone rubber layer 304 at positions corresponding to the conductive adhesive 303.

The bottom board 305 is attached to the rear surface of the main control board 302, with its four edges being folded vertically so as to constitute a guard member 3051. The guard member 3051 has a thickness equal to a sum of the thickness of the water-proof silicone rubber layer 304 and the thickness of the main control board 302. When the keyboard is fixedly assembled together via stud bolts 3011 on the keystroke panel 301, the water-proof silicone rubber layer 304 and the main control board 302 are pressed between the keystroke panel 301 and the bottom board 305. The guard member 3051 fully encloses edges of the water-proof silicone rubber layer 304 and of the main control board 302, and is tightly fixed with the keystroke panel. The guard member 3051 surrounds the main control board 302 on all sides, and closely contacts with the keystroke panel 201, which ensures that the removal detection points 3022 are not being attacked by poking from the outside, and effectively prevents the side surfaces of the encryption keyboard from being attacked by the criminal inserting a hard object through a clearance between the conductive adhesive and the panel.

Figure 5:
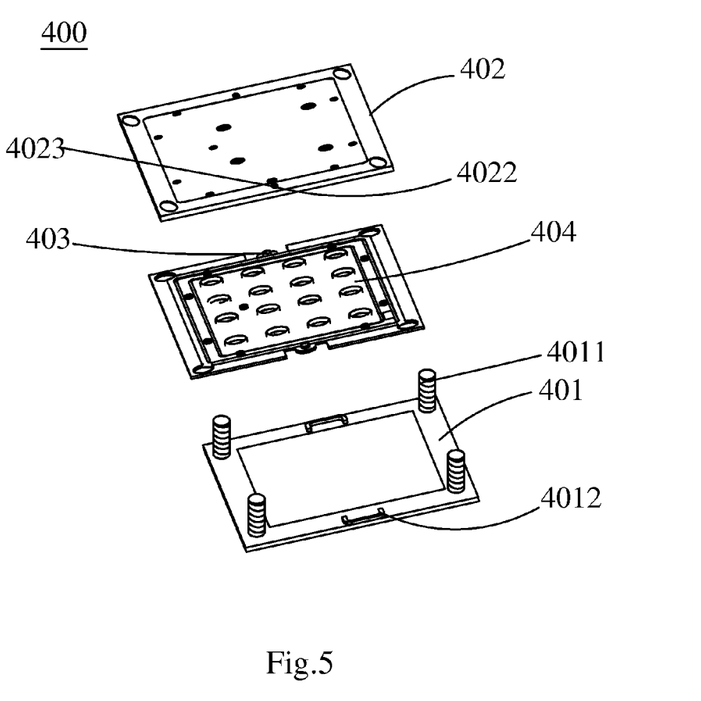
FIG. 5 is an exploded schematic view of an encryption keyboard for preventing illegal disassembly according to a fourth embodiment of the present invention.

Referring to FIG. 5, an exploded schematic view of an encryption keyboard for preventing illegal disassembly according to a fourth embodiment of the present invention is shown. An encryption keyboard 400 according to the present invention includes a keystroke panel 401, a water-proof silicone rubber layer 404 and a main control board 402. A removal detection and protection circuit (not shown) is provided in a main chip of the main control board 402, and two lead pins of the removal detection and protection circuit are led out from two opposite edges of the surface, which is adjacent to the keystroke panel 401, of the main control board 402 to form removal detection points 4022. The removal detection point 4022 is provided with two disconnected signal contacts which are connected by conductive adhesive 403 to activate the removal detection and protection circuit. A conductive protection ring 4023 is provided outside each removal detection point 4022, and is isolated from the removal detection point 4022. The conductive protection ring 4023 is connected to the removal detection and protection circuit in the main chip. The conductive adhesive 403 is received in recesses provided in the surface of the water-proof silicone rubber layer 404 adjacent to the main control board.

Hard metal guard members 4012 with a semi-enclosure structure are fixedly provided on the keystroke panel 401 at the outside of the positions corresponding to the conductive protection rings 4022. The semi-enclosure guard member 4012 is open towards the center of the main control board. The semi-enclosure guard member 4012 is fixedly connected with the keystroke panel 401 by welding or integral forming.

The thickness of the hard metal guard member 4012 is substantially equal to the thickness of the water-proof silicone rubber layer 404. When the keyboard is fixedly assembled together via stud bolts 4011 on the keystroke panel 401, the water-proof silicone rubber layer 404 and the hard metal guard member 4012 are pressed between the key panel 401 and the main control board 402 and fixed together tightly. Thus, there is no clearance between the hard metal guard member 4012 and the main control board 402, as well as between the hard metal guard member 4012 and the keystroke panel 401, which can ensure that the removal detection points 4022 are not being attacked by poking from the outside, and can effectively prevent the side surfaces of the encryption keyboard from being attacked by the criminal inserting a hard object through a clearance between the conductive adhesive and the panel.

Figure 6:
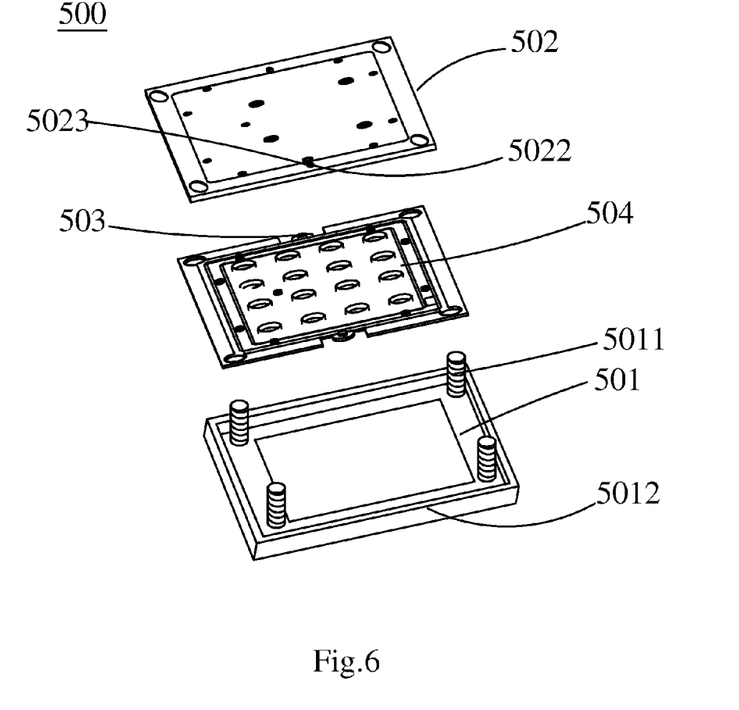
FIG. 6 is an exploded schematic view of an encryption keyboard for preventing illegal disassembly according to a fifth embodiment of the present invention.

Referring to FIG. 6, an exploded schematic view of an encryption keyboard for preventing illegal disassembly according to a fifth embodiment of the present invention is shown. An encryption keyboard 500 according to the present invention includes a keystroke panel 501, a water-proof silicone rubber layer 504, and a main control board 502. A removal detection and protection circuit (not shown) is provided in a main chip of the main control board 502, and two lead pins of the removal detection and protection circuit are led out from two opposite edges of the surface, which is adjacent to the keystroke panel 501, of the main control board 502 to form removal detection points 5022. The removal detection point 5022 is provided with two disconnected signal contacts which are connected by conductive adhesive 503 to activate the removal detection and protection circuit. A conductive protection ring 5023 is provided outside each removal detection point 5022, and is isolated from the removal detection point 5022. The conductive protection rings 5023 are connected to the removal detection and protection circuit in the main chip. The conductive adhesive 503 is received in recesses provided in a surface of the water-proof silicone rubber layer 504 adjacent to the main control board.

Four edges of the keystroke panel 501 are folded vertically to constitute a guard member 5012. The guard member 5012 has a thickness equal to a sum of the thickness of the water-proof silicone rubber layer 504 and the thickness of the main control board 502. When the keyboard is fixedly assembled together via stud bolts 5011 on the keystroke panel 501, the water-proof silicone rubber layer 504 is pressed between the keystroke panel 501 and the main control board 502. The guard member 5012 fully encloses edges of the water proof silicone rubber layer 504 and of the main control board 502, and is tightly fixed with the keystroke panel. The guard member 5012 surrounds edges of the main control board 502 on all sides, and closely contacts with the main control board 502, which ensures that the removal detection points 5022 are not being attacked by poking from the outside, and effectively prevents the side surfaces of the encryption keyboard from being attacked by the criminal inserting a hard object through a clearance between the conductive adhesive and the panel.

The above embodiments are only preferred embodiments. In order to improve the security of the encryption keyboard, more protection layers may be provided for the encryption keyboard if desired. Many modifications and improvements may be made based on the prior art by the person skilled in the art without departing from the principle of the present invention, and these modifications and improvements should be deemed to fall into the protection scope of the present invention.

What is claimed is:

1. An encryption keyboard for preventing illegal disassembly, comprising a keystroke panel and a main control board, wherein a removal detection and protection circuit is provided in a main chip of the main control board, at least one lead pin of the removal detection and protection circuit is led out from a surface of the main control board adjacent to the keystroke panel so as to form a removal detection point, the removal detection point is provided with two disconnected signal contacts which are connected by conductive adhesive to activate the removal detection and protection circuit, a conductive protection ring is provided outside the removal detection point and is isolated from the removal detection point, the conductive protection ring is connected to the removal detection and protection circuit in the main chip, characterized in that, a guard member is provided at the outside of the conductive protection ring and of the conductive adhesive.

2. The encryption keyboard according to claim 1, wherein the guard member is provided with at least two hooks, each of the hooks inserts into a semi-blind hole in a surface of the main control board adjacent to the keystroke panel, and the guard member is fixed with the main control board by welding.

3. The encryption keyboard according to claim 2, wherein the guard member is a conductive metal ring which is electrically connected to the removal detection and protection circuit in the main control board.

4. The encryption keyboard according to claim 1, wherein the guard member is fixedly disposed on a surface, which is adjacent to the main control board, of the keystroke panel at the outside of a position corresponding to the conductive protection ring.

5. The encryption keyboard according to claim 1, wherein a bottom board is provided at a side of the main control board away from the keystroke panel, the guard member is fixedly disposed on a surface, which is adjacent to the main control board, of the bottom board at the outside of a position corresponding to the conductive protection ring, and the main control board is provided with a groove at a position corresponding to the guard member.

6. The encryption keyboard according to claim 1, wherein the guard member is formed by vertically folding edges of the keystroke panel towards the main control board so as to fully enclose edges of the main control board when being assembled.

7. The encryption keyboard according to claim 1, wherein a bottom board is provided at a side of the main control board away from the keystroke panel, the guard member is formed by vertically folding edges of the bottom board towards the main control board so as to fully enclose edges of the main control board when being assembled.

8. The encryption keyboard according to claim 6, wherein a water-proof silicone rubber layer is provided between the keystroke panel and the main control board, the water-proof silicone rubber layer is provided with a conductive adhesive recess at a position corresponding to the conductive adhesive.

9. The encryption keyboard according to claim 1, wherein a water-proof silicone rubber layer is provided between the keystroke panel and the main control board, the water-proof silicone rubber layer is provided with a conductive adhesive recess at a position corresponding to the conductive adhesive.

10. The encryption keyboard according to claim 9, wherein a groove or a hole for receiving the guard member is provided in the water-proof silicone rubber layer at a position corresponding to the guard member.

* * * * *